(12) United States Patent
Hunt et al.

(10) Patent No.: US 10,171,301 B2
(45) Date of Patent: Jan. 1, 2019

(54) IDENTIFYING HARDCODED IP ADDRESSES

(71) Applicant: International Business Machines Corporation, Armonk, NY (US)

(72) Inventors: Anthony M. Hunt, Hopewell Junction, NY (US); Dennis A. Perpetua, Jr., Jay, NY (US); Srinivasa Raghavan, Morrisville, NC (US); Clea A. Zolotow, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 14/809,353

(22) Filed: Jul. 27, 2015

(65) Prior Publication Data
US 2017/0033994 A1    Feb. 2, 2017

(51) Int. Cl.
*H04L 12/24* (2006.01)
*H04L 29/12* (2006.01)

(52) U.S. Cl.
CPC ........ *H04L 41/0853* (2013.01); *H04L 61/103* (2013.01); *H04L 61/2007* (2013.01); *H04L 61/6009* (2013.01); *H04L 61/6022* (2013.01)

(58) Field of Classification Search
CPC ............... H04L 41/0853; H04L 61/103; H04L 61/2007; H04L 61/6009; H04L 61/6022
USPC ........................................................ 709/220
See application file for complete search history.

(56) References Cited

U.S. PATENT DOCUMENTS

| | | | | |
|---|---|---|---|---|
| 5,974,453 A * | 10/1999 | Andersen | ................ | H04L 61/10 709/220 |
| 7,103,648 B1 * | 9/2006 | Burrows | ............. | H04L 61/2015 709/220 |
| 7,171,464 B1 * | 1/2007 | Raghuraman | ....... | H04L 43/0817 709/224 |
| 7,200,649 B1 * | 4/2007 | Batke | ................ | H04L 29/12264 370/252 |

(Continued)

FOREIGN PATENT DOCUMENTS

WO    WO2014004721    1/2014

OTHER PUBLICATIONS

A Practical Code Signing Server for the Enterprise, IP.com No. 000236621, IP.com Electronic Publication: May 6, 2014, 11 pages.

(Continued)

*Primary Examiner* — Viet D Vu
*Assistant Examiner* — Timothy J Sowa
(74) *Attorney, Agent, or Firm* — Schmeiser, Olsen & Watts, LLP; Michael Petrocelli

(57) ABSTRACT

A method and associated systems for identifying hardcoded network addresses. A network-migration tool requests from a network certain types of data that may identify IP addresses used by the network and receives a subset of the requested data. The system infers from the manner in which received data characterizes IP addresses which of those addresses are likely to be hardcoded. If the system receives a list of server affinities, it infers that an IP address used for communication between servers in a same affinity group is hardcoded if that address is not listed by an associated DNS server. If a received ARP cache lists an IP address as having been resolved to a MAC address, the system infers that the IP address cannot be hardcoded. If a received TCP trace log lists an address without a corresponding hostname the system infers that the address is hardcoded.

9 Claims, 5 Drawing Sheets

(56) References Cited

U.S. PATENT DOCUMENTS

| | | | |
|---|---|---|---|
| 8,082,333 B2 * | 12/2011 | Huang | H04L 63/101 709/220 |
| 9,124,585 B1 * | 9/2015 | Yen | H04L 61/10 |
| 2002/0103931 A1 * | 8/2002 | Mott | H04L 12/4641 709/245 |
| 2004/0059807 A1 * | 3/2004 | Klotz | H04L 41/0631 709/223 |
| 2005/0078606 A1 * | 4/2005 | Bernstein | H04L 67/22 370/241 |
| 2005/0080598 A1 | 4/2005 | Iwanojko et al. | |
| 2005/0138152 A1 * | 6/2005 | Kruse | H04L 29/12009 709/223 |
| 2007/0022211 A1 * | 1/2007 | Shimizu | H04L 29/12028 709/238 |
| 2009/0198800 A1 * | 8/2009 | Dighe | H04L 29/12028 709/221 |
| 2009/0232025 A1 * | 9/2009 | Baggott | H04L 29/12801 370/254 |
| 2010/0146121 A1 * | 6/2010 | Schwimer | G06F 15/173 709/226 |
| 2010/0318633 A1 * | 12/2010 | Abzarian | H04L 29/12028 709/219 |
| 2012/0054727 A1 * | 3/2012 | Joukov | G06F 9/44505 717/168 |
| 2012/0131197 A1 * | 5/2012 | Prentice | H04L 61/103 709/226 |
| 2014/0059189 A1 * | 2/2014 | Kolbly | H04L 41/0803 709/220 |
| 2014/0115584 A1 * | 4/2014 | Mudigonda | H04L 67/1095 718/1 |

OTHER PUBLICATIONS

B. Aboba et al., Principles of Internet Host Configuration (RFC5505), IP.com Electronic Publication: May 20, 2009, IP.com No. 000183369, 51 pages.

C. Mickles et al., Survey of IPv4 Addresses in Currently Deployed IETF Internet Area Standards Track and Experimental Documents (RFC3790), IP.com Electronic Publication: Jun. 9, 2004, IP.com No. 000028950, 51 pages.

* cited by examiner

IDENTIFYING HARDCODED IP ADDRESSES

TECHNICAL FIELD

The present invention relates to identifying hardcoded IP addresses when migrating or otherwise processing networked resources.

BACKGROUND

Consolidating, migrating, updating, or otherwise modifying a cloud-computing environment, enterprise network, or other networked entity may require assigning new network addresses to each resource affected by the modification. These assignments maybe performed manually by a network administrator or engineer, or may be performed automatically by a network-management tool.

It may not be possible, however, to change certain network addresses during such a modification. A hardcoded address may, for example, be explicitly specified in the source code of a software application or may be physically embedded into a physical or virtual device's hardware or firmware. If such a static, hardcoded, address is not identified during a network modification, the persons or tools that manage the modification may attempt to alter a static address of a network device or software module, requiring manual correction in order to rectify any resulting failures or errors.

There is currently no straightforward way to automatically identify hardcoded addresses before they begin to generate errors caused by an unsuccessful attempt to alter them.

BRIEF SUMMARY

A first embodiment of the present invention provides a computerized network-migration system comprising a processor, a memory coupled to the processor, a computer-readable hardware storage device coupled to the processor, and an interface to a network-management system, where the network-management system identifies network-configuration information that describes at least one component of a computer network to be migrated, where the interface allows the network-migration system to interactively access the network-configuration information, and where the storage device contains program code configured to be run by the processor via the memory to implement a method for identifying hardcoded IP addresses, the method comprising:

the network-migration system requesting a latest version of the network-configuration information;

the network-migration system receiving, in response to the requesting, a subset of the requested network-configuration information; and the network-migration system choosing, as a function of a way in which an Internet Protocol address of a component of the computer network to be migrated is characterized in the received network-configuration information, an optimal method of identifying whether the Internet Protocol address is hardcoded.

A second embodiment of the present invention provides method for identifying hardcoded IP addresses, the method comprising:

a network-migration system requesting a latest version of a set of network-configuration information that comprises:

a server-affinity listing that identifies a network address and corresponding hostname used by two or more servers comprised by the network to be migrated, where the two or more servers must use the network address and corresponding hostname to communicate with each other in order to function correctly, a list of cached ARP address lookups stored in an address-resolution protocol cache associated with the computer network, a DNS list of hostnames maintained by a Domain Name System server associated with the computer network, a listing of open network connections between a component of the computer network and a component of a remote resource that is not comprised by the computer network, and a TCP trace log that has recorded one or more operations of the computer network;

the network-migration system receiving, in response to the requesting, a subset of the requested set of network-configuration information; and the network-migration system choosing, as a function of a way in which a first Internet Protocol address of a component of the computer network to be migrated is characterized in the received network-configuration information, an optimal method of identifying whether the first Internet Protocol address is hardcoded.

where the optimal method is selected from a group comprising a network-view analytic method, a server-view analytic method, and a log-based analytic method, where the network-view method determines that the first Internet Protocol address is identified by a received server-affinity listing as a hardcoded address because the first Internet Protocol address is not comprised by a received DNS list;

where the server-based method determines that the first Internet Protocol address is a hardcoded address because the first Internet Protocol address is not identified by a received list of cached ARP address lookups; and where the trace-log method determines that the first Internet Protocol address is not a hardcoded address because the first Internet Protocol address is not associated with a hostname in a received TCP trace log.

A third embodiment of the present invention provides computer program product, comprising a computer-readable hardware storage device having a computer-readable program code stored therein, the program code configured to be executed by a network-migration system comprising a processor, a memory coupled to the processor, and a computer-readable hardware storage device coupled to the processor, the storage device containing program code configured to be run by the processor via the memory to implement a method for identifying hardcoded IP addresses, the method comprising:

a network-migration system requesting a latest version of a set of network-configuration information that comprises:

a server-affinity listing that identifies a network address and corresponding hostname used by two or more servers comprised by the network to be migrated, where the two or more servers must use the network address and corresponding hostname to communicate with each other in order to function correctly, a list of cached ARP address lookups stored in an address-resolution protocol cache associated with the computer network, a DNS list of hostnames maintained by a Domain Name System server associated with the computer network, a listing of open network connections between a component of the computer network and a component of a remote resource that is not comprised by the computer network, and a TCP trace log that has recorded one or more operations of the computer network;

the network-migration system receiving, in response to the requesting, a subset of the requested set of network-configuration information; and the network-migration system choosing, as a function of a way in which a first Internet Protocol address of a component of the computer network to be migrated is characterized in the received network-configuration information, an optimal method of identifying whether the first Internet Protocol address is hardcoded.

where the optimal method is selected from a group comprising a network-view analytic method, a server-view analytic method, and a log-based analytic method, where the network-view method determines that the first Internet Protocol address is identified by a received server-affinity listing as a hardcoded address because the first Internet Protocol address is not comprised by a received DNS list;

where the server-based method determines that the first Internet Protocol address is a hardcoded address because the first Internet Protocol address is not identified by a received list of cached ARP address lookups; and where the trace-log method determines that the first Internet Protocol address is not a hardcoded address because the first Internet Protocol address is not associated with a hostname in a received TCP trace log.

DETAILED DESCRIPTION

Figure 1:
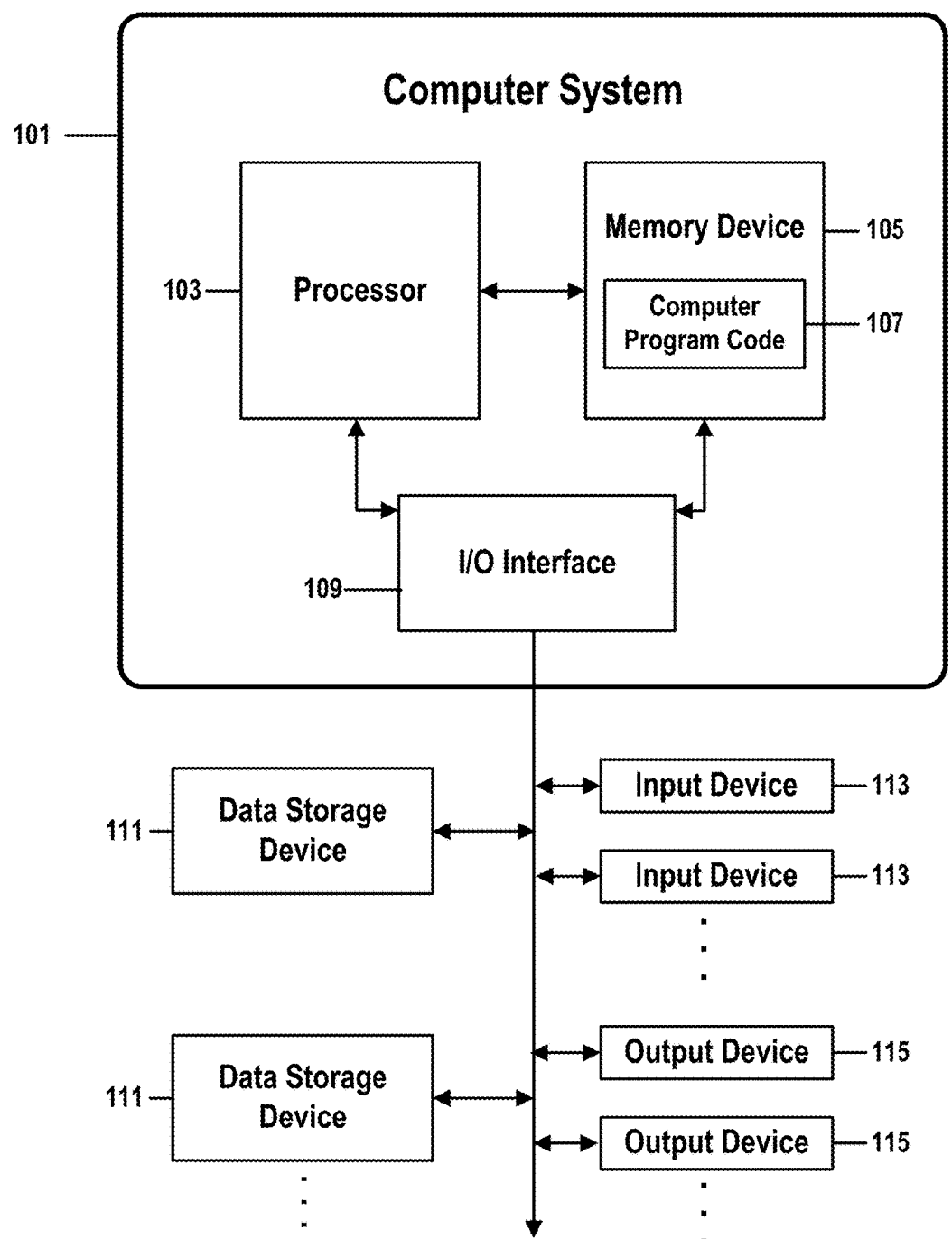
FIG. 1 shows a structure of a computer system and computer program code that may be used to implement a method for identifying hardcoded IP addresses in accordance with embodiments of the present invention.

Planning a network modification, such as a datacenter consolidation, an application migration, or a hardware or software upgrade, requires an evaluation of dependencies and communications paths among applications, local and remote resources, and physical and virtual infrastructure components. In a cloud-computing environment or IP-based enterprise network, for example, a first application may communicate with a second application, a remote network interface, or a user device by sending messages to a network IP address associated with that application, interface, or device.

In many cases, one network resource may depend upon a second resource, and if the first resource is unable to correctly identify an IP address of the second resource, the first resource will fail. In such cases, the dependent resources are said to "share an affinity" or to be members of a same "affinity group."

A transaction-processing system, for example, may need to access a database stored on a virtual hard drive. If the system is unable to identify a network address associated with that drive, the system will be unable to access data stored in the database. Similar issues arise in other types of network environments, when other types of identifiers allow resources to be located in a cellular, wireless, or other type of networked environment.

When performing a modification upon all or part of a network, such dependencies must be identified in order to ensure that each resource is able to access the resources upon which it depends. Some network-management tools may try to track such dependencies through application-specific configuration scans, and then further attempt to automatically adjust network addresses such that pre-modification relationships among network components are not disrupted by the modification.

This method is far from foolproof and may fail to identify addresses that are hardcoded into an application. This may occur when, for example, a line of source code expressly identifies an Internet Protocol address as a constant, a fixed string, or a deterministic output of a function that does not account for a possibility that the resource identified by the address may be relocated to a different address. In such a case, when the resource or the platform on which it resides is migrated to a new address, the application will no longer be able to locate the resource at the hardcoded address specified by the application's source code. Because a network-management tool is generally unable to examine an application's source code to identify such hardcoded (or static) addresses, conventional migration tools may disrupt an application that is designed to communicate to or through a hardcoded address.

Embodiments of the present invention address this problem by identifying dependencies among applications and other network resources before a network tool or administrator determines which network addresses to change. This task is performed by applying methods of analytics in novel ways to infer the existence of hardcoded network addresses from generally available network, infrastructure, or system-related data.

An embodiment may accomplish this task in two steps. The embodiment first analyzes information associated with the networked entity being modified in order to select an analytic method most likely to identify hardcoded addresses. If, for example, a component of the network platform maintains an Address Resolution Cache (ARC) that resolves IP addresses to Media Access Control layer addresses, and if a sufficient number of cache entries exist to provide statistically meaningful results, an embodiment may determine that the most accurate way to identify hardcoded addresses is to apply analytic methods to information stored in the cache.

After selecting, in this manner, an optimal analytic method for identifying hardcoded addresses, an embodiment would then proceed to further use the selected method to actually identify such addresses. In some embodiments, this procedure may be performed multiple times, either at times that conform to a schedule or that satisfy a preset condition, or performed iteratively, until an identification of a hardcoded address satisfies a preset confidence level.

There is no other discovery, comparison, or analytic method or system available today that can automatically identify hard coded IP addresses prior to a network, application, or system migration. Existing application-dependency scanning tools may be able to discover a connectivity relationship between two network resources, but they can identify only that the resources communicate with each other. Unlike embodiments of the present invention, they cannot identify whether the ports, IP addresses, or other communications resources used by the applications are dynamic or static.

Figure 4:
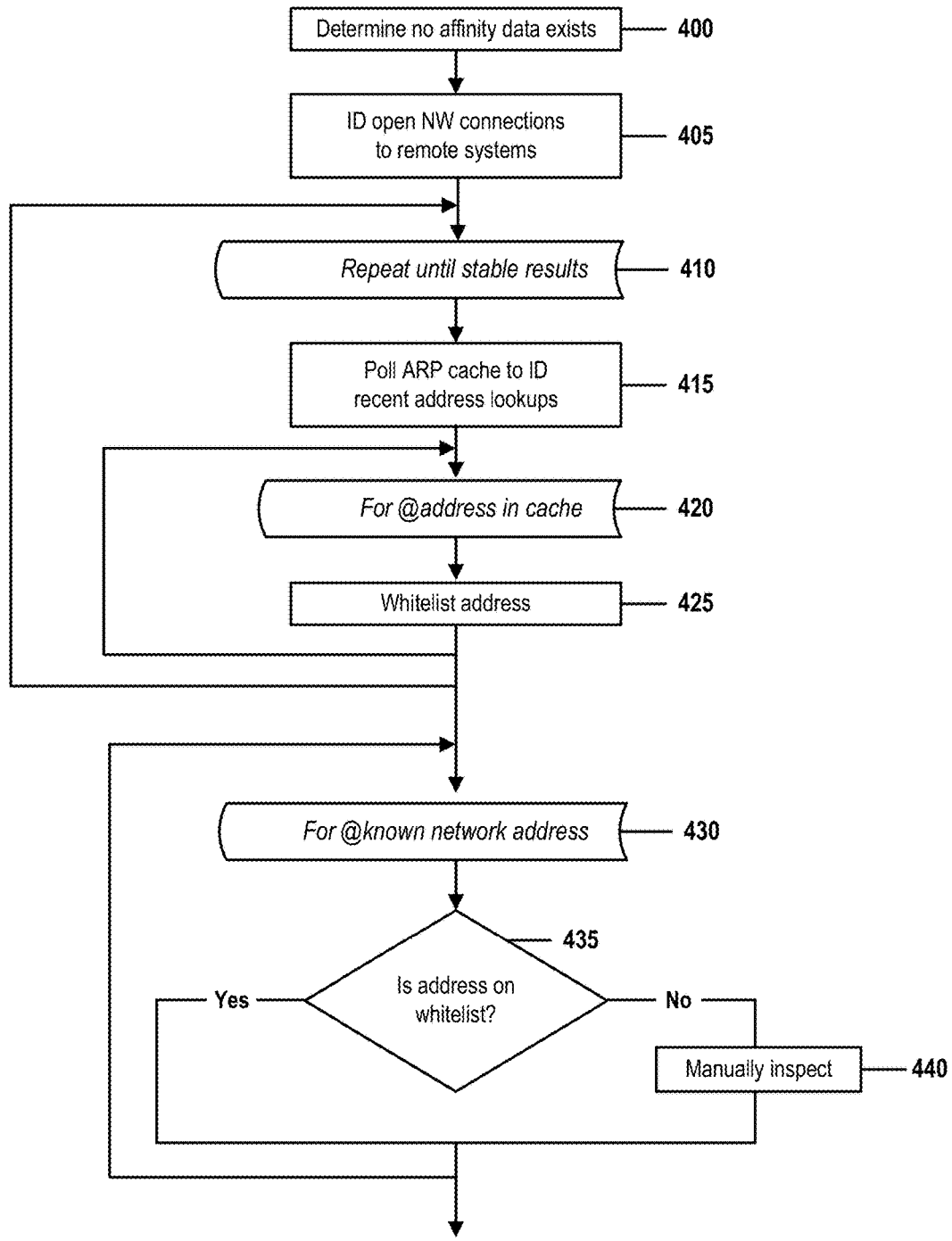
FIG. 4 is a flow chart that describes in greater detail a "server-based" analytic method of identifying hardcoded addresses in accordance with embodiments of the present invention.
Figure 5:
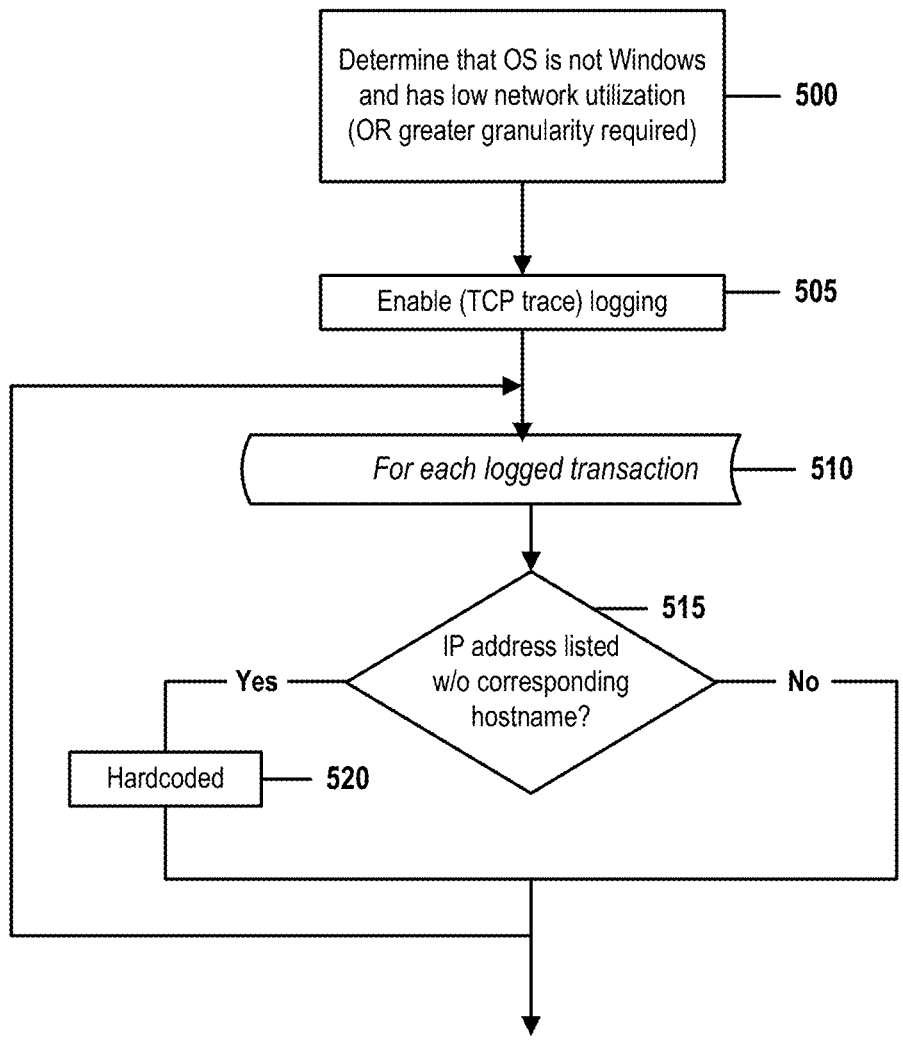
FIG. 5 is a flow chart that describes in greater detail a "log-based" analytic method of identifying hardcoded addresses in accordance with embodiments of the present invention.

This document describes three such inferential or analytic methods of identifying hardcoded addresses, which will be referred to as Network View (FIG. 3), Server Based Polling (FIG. 4), and Log Based Discovery (FIG. 5). Other embodiments may include additional methods that apply similar inferential procedures to other types of generally available information, in order to identify likely hardcoded addresses without examining internal elements of an application or other network or infrastructure resource. In most embodiments, this generally available information identifies or aids in mapping with "layer 3" (Operating System) data, such as an IP address, with "layer 2" (Media Access Control) data, such as a MAC address associated with a resource identified by an IP address.

Analytics-based methods of the present invention may thus be applied in a general manner to many types of tasks and to many types of networked environments. In further embodiments, this general method may be applied to other types of tasks and environments, where automated methods of mapping resources may have to account for the existence of hard-to-identify non-mappable resource identifies. Embodiments described in the examples below generally describe implementations that involve identifying static Internet Protocol addresses that cannot be modified when consolidating, migrating, or otherwise modifying a TCP/IP network. But these examples should not be construed to limit embodiments of the present invention to these applications and platforms.

Using the analytics-based methods of the present invention in this manner may mitigate or eliminate a burdensome task of manually identifying hardcoded addresses by waiting for errors to occur after a network-modification has been implemented. Such a benefit is difficult to achieve though normal methods because many legacy applications have IP addresses hardcoded into one or more configuration files or directly embedded into an application's source code. It would in most cases thus be impossible for a network-management system to determine whether an application incorporates dynamic or static addressing methods (or both) in order to identify or communicate with another application or network resource, unless the system has been expressly tailored to accommodate every application-specific configuration means or to examine every application's source code. Such a task is generally impossible.

The result is that tasks like migrating applications or global network resources, or upgrading network infrastructure, generally involves an iterative after-the-fact task of manually correcting every configuration error that occurs because of a failure to determine that a hardcoded network address could not be modified. Whether this after-the-fact task is performed by means of exhaustive post-migration testing or by simply correcting each error as it occurs, an inability to identify hardcoded addresses prior to implementing a network modification can be costly, time-consuming, and risk the loss of critical services or data.

FIGS. 1-5 below describe in greater detail embodiments of the present invention that automatically identify network addresses most likely to be hardcoded without requiring special knowledge of applications or other network resources that make use of those addresses.

FIG. 1 shows a structure of a computer system and computer program code that may be used to implement a method for identifying hardcoded IP addresses in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for identifying hardcoded IP addresses in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for identifying hardcoded IP addresses.

Any of the components of the present invention could be created, integrated, hosted, maintained, deployed, managed, serviced, supported, etc. by a service provider who offers to facilitate a method for identifying hardcoded IP addresses. Thus the present invention discloses a process for deploying or integrating computing infrastructure, comprising integrating computer-readable code into the computer system 101, wherein the code in combination with the computer system 101 is capable of performing a method for identifying hardcoded IP addresses.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for identifying hardcoded IP addresses may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for identifying hardcoded IP addresses data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Some embodiments may comprise additional specialized hardware, such as a network-logging mechanism that records or characterizes transactions, communications, or other events or activities of the network, either in real time or by automatically accessing other recorded logs of the network. Some embodiments may comprise other types of specialized systems, software, or hardware, such as a sensor, a monitoring device, a network-configuration or maintenance utility, a specialized computing device, a virtual or physical component of a local-area, wide-area, or virtualized network or associated infrastructure, or a specialized interface or reporting mechanism.

Figure 2:
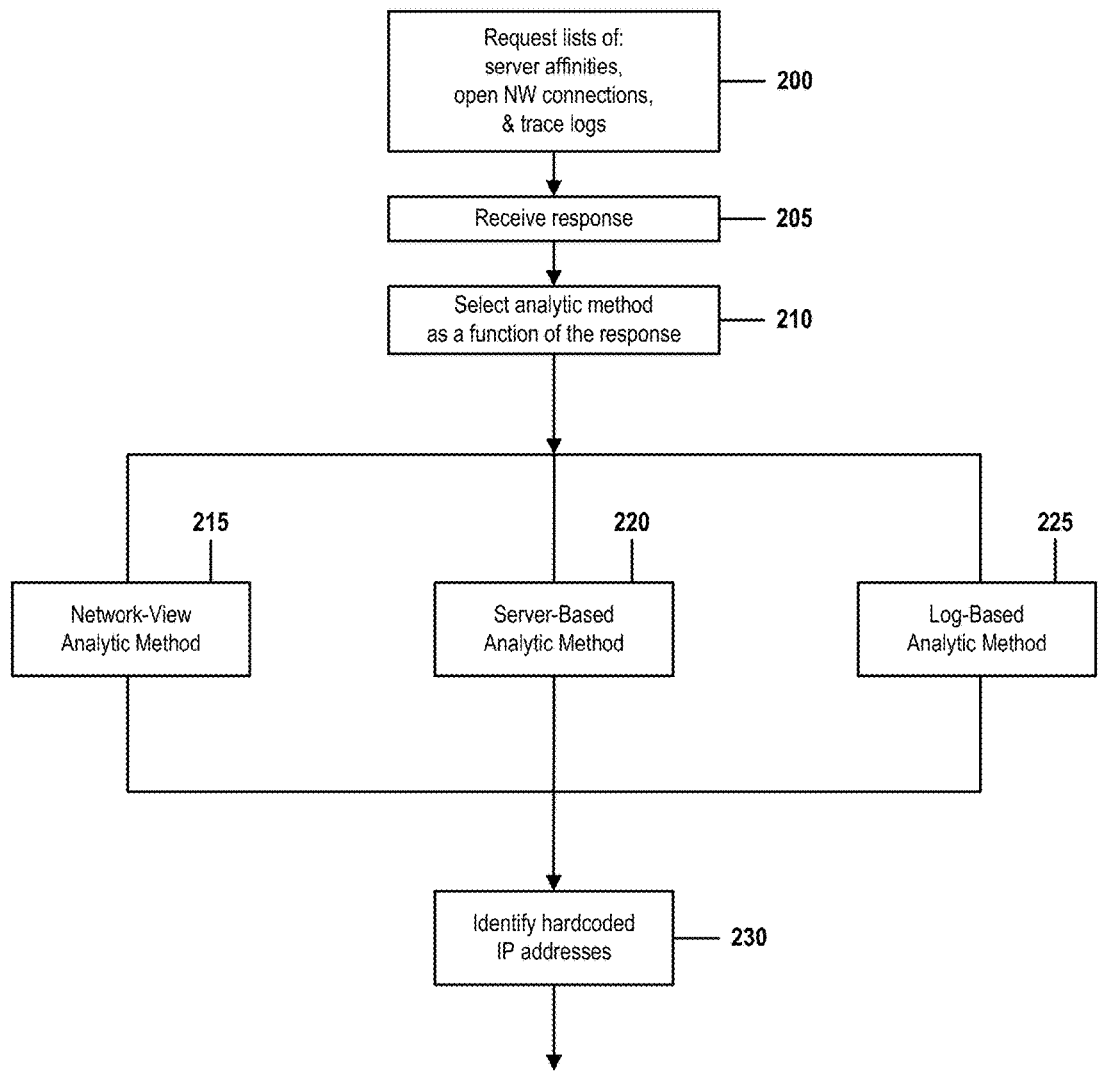
FIG. 2 is a top-level flow chart that overviews a method for identifying hardcoded IP addresses in accordance with embodiments of the present invention.

FIG. 2 is a top-level flow chart that overviews a method for identifying hardcoded IP addresses in accordance with embodiments of the present invention. FIG. 2 shows elements identified by reference numbers 200-230.

In step 200, a computerized network-migration system transmits one or more information requests to entities associated with a network to be migrated, updated, or otherwise processed. These entities may comprise a combination of a server, a network-management console, an other network-administration resource, a virtual resource, a virtual or physical infrastructure component, a remote information repository, or an other information source that may be accessed by the network-migration system.

This requested information may include: a list of server affinities, a list of open network connections, one or more files of logged data, or other types of information that may indicate a configuration, a setting, a performance of a function, or other characteristic of the network or of a hardware or software entity associated with the network.

In this context, two servers (or other networked entities) may be considered to share an affinity if they communicate, or are required to, communicate, with each other. In one example, if a first server hosts a transaction-processing application and a second server hosts a database, the two servers might share an affinity if the two servers regularly communicate over the network in order for the transaction-processing application to access information stored in the database.

In step 205, the system receives one or more responses from the entities from which it requested information in step 200. In some cases, the system may not receive all the information or all the types of information requested in step 200.

In step 210, the system selects an analytic method of identifying hardcoded addresses of the network as a function of the information received in step 205. This procedure is described in greater detail in FIGS. 3-5. If, for example, the system receives a server-affinity list in step 205, the system might select an analytic method based on an overview of the entire network, and thus continue with step 215 (elaborated in FIG. 3). Alternatively, if the system does not receive what appears to be a reliable server-affinity list, the system might continue with a server-based method (shown in step 220 and FIG. 4) that identifies likely hardcoded addresses by comparing a list of open network connections to the contents of one or more Address Resolution Protocol (ARP) caches. If the migrating network is not based on a WINDOWS or WINDOWS-like operating system or has a low level of utilization, or if a greater degree of granularity is desired, then the system might instead continue with step 225 (shown in more detail in FIG. 5) in order to identify likely hardcoded addresses by analyzing the contents of one or more system logs.

In some embodiments, step 210 may supplement the selection procedure shown in FIG. 2 by adding other analytic (or other types of) methods of identifying hardcoded network addresses or identifiers.

In some embodiments, the criteria by which analytic methods that may be selected by step 210 must always be mutually exclusive, such that there is no ambiguity about which method is to be selected. In other embodiments, the criteria by which an analytic method is selected in step 210 may not all be mutually exclusive. That is, it may be possible that more than one sets of selection criteria may be satisfied during a performance of a method of FIG. 2. In such case, other, extrinsic criteria may be used to select a method from those methods that would otherwise qualify for selection in step 210. In some cases, analytic methods may be prioritized or otherwise ordered such that, if more than one method may be selected in step 210, the system will choose the highest-priority method among those qualifying methods.

Although not shown in the generalized algorithm of FIG. 2, in some embodiments, it may be possible that none of the candidate analytic methods 215-225 satisfy selection criteria that would allow it to be selected in step 210. In such a case, the method of FIG. 2 might then terminate without performing steps 215-230, perhaps notifying a system administrator, a network-management software module or system, or other responsible party.

In step 230, the system identifies and reports IP addresses that are likely to be hardcoded as a function of operations performed in step 215, 220, or 225. This addresses may be reported to a system administrator, network administrator, or other person associated with the migration effort, or may be forwarded automatically to a software module or other hardware, software, or virtual system or network component.

Figure 3:
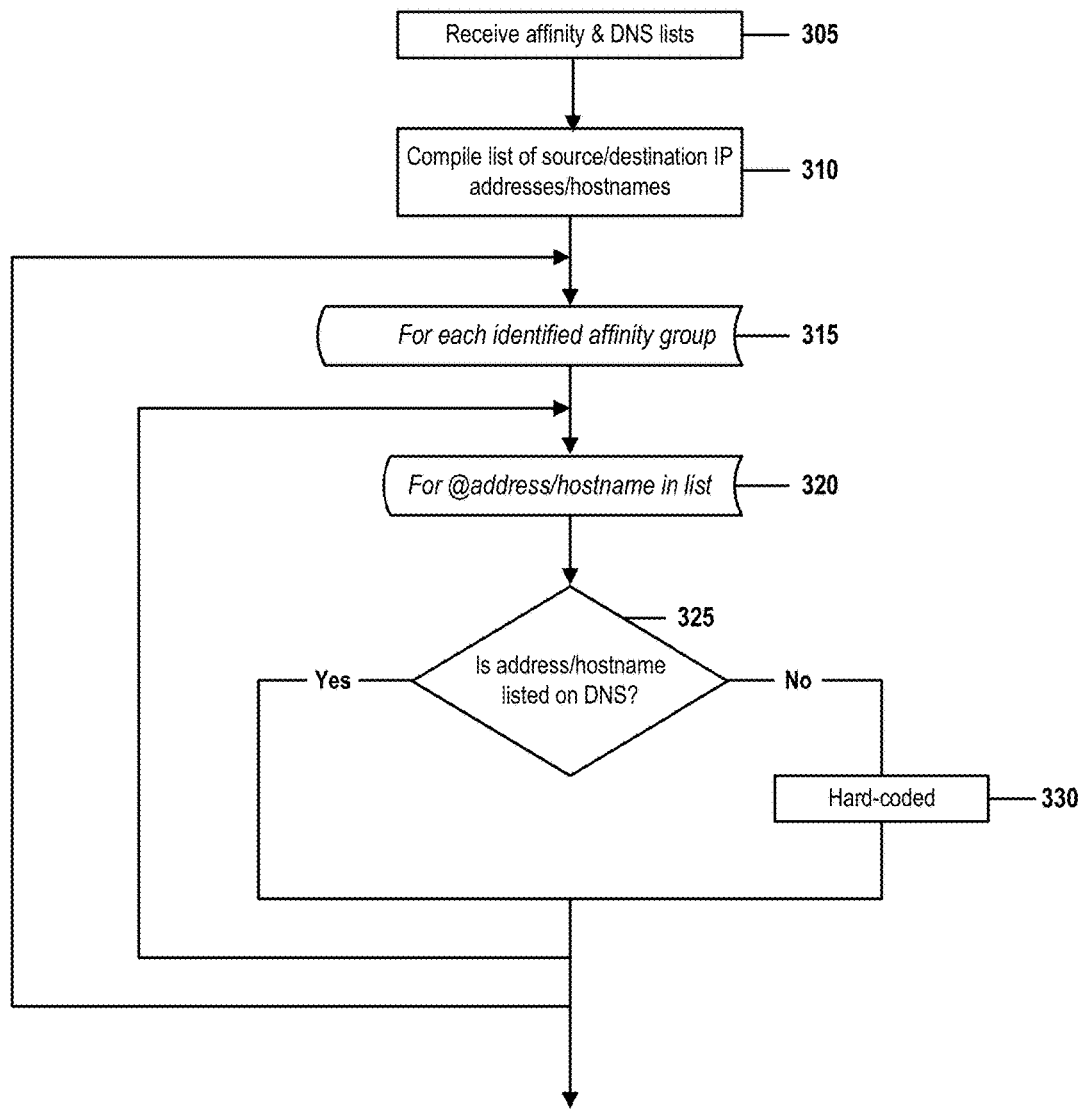
FIG. 3 is a flow chart that describes in greater detail a "network-view" analytic method of identifying hardcoded addresses in accordance with embodiments of the present invention.

FIG. 3 is a flow chart that describes in greater detail the "network-view" analytic method of identifying hardcoded addresses shown in step 215 of FIG. 2. FIG. 3 includes steps 305-330.

The method of FIG. 3 is performed only if selected by step 210 of FIG. 2. In examples described in this document, this selection occurs only if the migration system receives a list of one or more affinities in step 205 of FIG. 2 and if the system is able to access a list of IP addresses, hostnames, network addresses, or identifiers maintained by a network routing, address-resolution, name-server, or other network entity that facilitates identification of network resources on a global level. In embodiments implemented within a TCP/IP Internet or intranet environment, for example, such a list might enumerate hostnames and corresponding IP addresses maintained by one or more DNS domain name servers.

In other embodiments, this selection of a method of FIG. 3 occurs only if a receipt of such a list is accompanied by a satisfaction of some other condition, such as a scheduling or timing constraint, a requirement that the received affinity list comprise at least a minimum number of acceptable affinities (where an affinity is deemed to be "acceptable" if it comprises an entity, or a relationship among entities, that may be characterized in a specific way, such as by being associated with a threshold level of utilization or average bandwidth consumption), or an extrinsic condition, such as a completion of an other task associated with a network migration.

In step 305, the network-migration system receives a list of one or more server affinities in response to the system's request in step 205 of FIG. 2. Each affinity in the list identifies an affinity relationship among two or more servers (or other network entities). Each entity that shares a same same affinity relationship is known to communicate with all entities in the same affinity relationship.

In one example, if a Web application offers users functionality that depends upon accessing data with an e-commerce system, a first server on which the Web application runs is considered to be in an affinity relationship with a second server on which the e-commerce resides. In other words, the first server is in an affinity relationship with the second server because software running on the first server requires access to software running on the same server. Thus, when migrating either of the two servers, care must be taken to ensure that the other of the two servers is migrated in such a way that the two can continue to communicate after the migration.

In some embodiments, the system may receive a subset of all identifiable server-affinity relationships, where that subset may have been selected through a filtering process that, for example, may allow the system to receive affinities among only those servers, virtual machines, applications, or other network entities that satisfy a particular condition or that have a particular characteristic. A received subset of server affinities may, for example, include only those servers that run the most recent version of the WINDOWS operating system, or that run legacy marketing applications that are more than four years old.

An affinity list may be created and transmitted to the migration system through any means now or in the future known in the art. Such a means might, for example, comprise a server-based or network-based discovery process, in which a software tool traverses or otherwise analyzes a network topology, a virtualized-resource deployment, a network-management utility, or an application-configuration history.

In step 310, the system creates a list of source and destination network addresses or hostnames associated with networked entities listed by the received affinity list.

In one example, a received affinity list identifies a first affinity between a first server and a second server and a second affinity between a third server and a fourth server. The first and second servers communicate through a first pair of ports that are each associated with a distinct Internet Protocol address and logical hostname, and, similarly, the third and fourth servers communicate through a second pair of ports each associated with a distinct Internet Protocol address and a logical hostname. In this case, the migration system in step 310 would create a list of the four IP address/hostname pairs associated with the two received affinities.

Other embodiments may be implemented on a network or communications infrastructure that does not comprise a TCP/IP protocol stack. In such a case, a type of network-resource identifier known to those skilled in the art, other than an IP address or hostname, might be received and listed in steps 305 and 310.

In some embodiments, the system might in this step create a listing of all source and destination network addresses, hostnames, or other identifiers used by all network entities identified by the received affinity list to communicate with each other. In other embodiments, the system might in this step create a set of listings, each of which enumerates source and destination network addresses, hostnames, or other identifiers used by network entities identified by one of the affinities listed in the received affinity list to communicate with each other.

Step 315 initiates a top-level iterative process of steps 315-330. This process is performed once for each affinity group received in step 305.

Step 320 initiates a lower-level nested iterative process of steps 320-330. This process is performed once for each network address, hostname, or other identifier associated with one of the networked entities of the received affinity group being processed by the current iteration of the top-level iterative process of steps 320-330.

In one example, if the affinity list received in step 305 identifies 25 affinity groups, the top-level process of steps 315-330 will be performed 25 times, once for each received group. If the first received group is associated with twelve distinct hostname/IP address pairs, then the first iteration of the top-level process will perform twelve iterations of the lower-level nested process of steps 320-330.

In step 325, the migration system whether the current distinct network address or identifier is included in the DNS listing. If it is listed, then the system assumes a likelihood that the address may be associated by the Domain Name System (or by a similar function of a network system not based on TCP/IP) with a logical hostname. In this case, the system does not earmark the current network address as being likely to be a hardcoded or embedded address, the current iteration of the inner nested procedure of steps 320-330 ends, and the next iteration, if any, begins.

If the system in step 325 does not find the current distinct network address in the DNS listing, then the system proceeds to step 330.

In step 330, the migration system, having determined in step 325 that the network address is not listed in the DNS server hostname listing, assumes a likelihood that the network address is a hardcoded or embedded address not subject to domain-name resolution by a DNS server. In this case, the system earmarks the current network address as being likely to be a hardcoded or embedded address, the current iteration of the inner nested procedure of steps 320-330 ends, and the next iteration, if any, begins.

At the conclusion of each iteration of the inner nested procedure of steps 320-330, the network-migration system will have determined whether one network address identified by the received server affinity list is likely to be a hardcoded address.

At the conclusion of each iteration of the outer top-level procedure of steps 315-330, the network-migration system will have identified all network addresses associated with entities of one received affinity group that are likely to be hardcoded addresses.

At the conclusion of the final iteration of the outer top-level procedure of steps 315-330 (and the conclusion of the method of FIG. 3), the network-migration system will have identified all network addresses associated with all networked entities comprised by the received affinity listing that are likely to be hardcoded addresses. These addresses may then be forwarded to other software modules, network-management systems, or human network administrators in step 230 of FIG. 2 for verification that they are indeed hardcoded or embedded addresses that cannot be changed during a network migration, upgrade, reconfiguration, or other procedure.

FIG. 4 is a flow chart that describes in greater detail the "server-based" analytic method of identifying hardcoded addresses shown in step 220 of FIG. 2. FIG. 4 includes steps 400-440.

The method of FIG. 4 is performed if a server-based analytic method is selected by step 210 of FIG. 2. In examples described in this document, this selection occurs only if the migration system does not receive a list of one or more affinities in step 205 of FIG. 2 but does: i) receive a list of open network connections associated with entities of the migrating network, where those entities may use those open network connections to communicate with remote systems; and ii) is able to access contents of one or more address-resolution caches used by the network to identify Media Access Control (MAC) addresses associated with IP addresses by means of the ARP Address Resolution Protocol, as is known in the art.

In embodiments not implemented within a TCP/IP Internet or intranet environment, step 210 selects the server-based analytic method if the migration system receives or gains access to analogous types of network information.

In some embodiments, this selection of a method of FIG. 4 occurs only if receipt of any of the above types of data is accompanied by the satisfaction of some other condition, similar to the way a selection of FIG. 3 may depend upon conditions described above in the introduction to the description of FIG. 3.

The "server-based" analytic method works by guessing that a network address that has not been subject to a recent address-resolution procedure is more likely to be a hardcoded or embedded address.

Embodiments of the present invention may perform this task in various, implementation-dependent ways. The below description of FIG. 4 describes one possible implementation that is based on a TCP/IP network, but the inclusion of this description should not be construed to limit embodiments of the present invention to only TCP/IP networks.

In embodiments of the analytic method described below, the migration system polls one or more of the aforementioned ARP address-resolution caches associated with the migrating network. The goal of this polling is to identify recent ARP address lookups requested by hardware, software, virtual, or physical entities comprised by the network.

In a TCP/IP network like the Internet, a networked entity may be accessed through the network only if the network can identify a low-level MAC address associated with the second entity. But because a first networked resource or application may know only an IP address of a second networked resource, the first entity can communicate with the second entity only if the first entity is able to associate a unique MAC address with the second entity's IP address. Analogous constraints may exist in networks based on other types of network operating systems or communications protocol stacks.

Although embodiments and examples described here discuss methods based on the Internet Protocol's ARP address-resolution protocol, other embodiments may comprise similar or analogous procedures based on the newer Internet Protocol v6 NDP Neighbor Discovery Protocol, which offers functionality similar to of ARP.

One way to identify a lower-level MAC address of a networked resource known only by its higher-level IP address is by requesting that an address-resolution mechanism resolve that IP address to its underlying MAC address. Upon receiving such a request, the address-resolution will respond by returning to the requestor a MAC address that corresponds to the known IP address.

Because a hardcoded IP address can be associated with only one fixed, known MAC address, there is no reason to request that an ARP lookup be performed in order to identify a MAC address of a resource that is known by its IP address. In some cases, a request to resolve a hardcoded IP address will not result in a successful, cached lookup because the hardcoded address could not be translated into a host name.

Regardless of the details, embodiments assume that a network address that is never stored in an ARP cache implies that domain-name servers are not obtaining a MAC address by means of an ARP procedure, and that, if the network operating system is configured properly, such a network address is likely to be hardcoded. The analytic method of FIG. 4 thus takes advantage of this intrinsic characteristic of modern network infrastructures, to infer that addresses not found in an ARP cache are more likely to be hardcoded addresses.

A first TCP/IP-networked entity that desires to access a second TCP/IP-networked entity may thus attempt to identify the second entity's MAC address by requesting from the network an ARP address lookup of the second entity's known IP address.

Such an ARP address-resolution mechanism may be made more efficient by storing each address-resolution request and response in a high-speed cache for a period of time. This allows a network to resolve a popular or common IP address more efficiently by retrieving a previous resolution of that address from the cache, rather than initiating a new address-resolution procedure every time it attempts to resolve that popular address.

By reading the current contents of one or more ARP caches associated with the migrating network (sometimes maintained by one or more DNS servers), the network-migration system in step 410 may thus identify all IP addresses that have been successfully resolved to MAC addresses during a previous period of time. Although this period of time may be brief, by repeating this procedure over a longer duration, the method may accumulate a very high per centage of dynamic IP addresses that may be resolved MAC addresses.

The description of the method of FIG. 4 discusses embodiments of this strategy in greater detail.

In step 400, the network-migration system determines that no affinity list was received in step 205 of FIG. 2. In response, as discussed above in the description of steps 210 and 220 of FIG. 2, an embodiment of the present invention performs a server-based analytic method similar to that of FIG. 4.

In step 405, the migration system identifies or receives a list of open network connections associated with components of the network to be migrated. An application server on the network, for example, may maintain six open connections for use by applications running on that server, in order to allow those applications to query and receive data from a set of remote databases.

Step 410 begins an iterative procedure of steps 410-425. Each iteration of this procedure polls or queries one or more ARP caches in order to identify recent ARP IP address-resolutions.

This iterative procedure may be repeated over an extended period of time in order to accumulate enough cached IP address resolutions to provide sufficient confidence in the results. If, for example, an ARP cache is updated on average ever few milliseconds, the system may poll that cache every minute for six weeks in order to gather a large enough number of address-resolution data to ensure statistically meaningful results.

In step 415, the system polls the one or more caches to retrieve a list of all recent successful IP address resolutions. In most cases, it may be inferred that these resolutions identify dynamic network addresses that are not hardcoded or embedded.

Step 420 begins an iterative procedure of steps 420 and 425 that is repeated for each network address read from the caches in the most recent iteration of step 415.

In step 425, the system enters one of the addresses read in step 415 onto a whitelist, if that address is not already in the whitelist.

At the conclusion of the final iteration of the procedure of steps 420 and 425, the whitelist will have been updated to contain all IP network addresses read from an ARP cache during the most recent iteration of step 415. At this stage, the next iteration of the higher-level procedure of steps 410-425 begins.

The higher-level procedure of steps 410-425 may continue in this manner until an implementation-dependent condition is met. In some cases, they may continue for a fixed, predetermined, or manually set period of time. This period of time may be determined by a network administrator, manager, or designer as a function of system, infrastructure, or network utilization or capacity characteristics.

In other embodiments, this higher-level procedure of steps 410-425 may repeat until one or more successive iterations fail to add new addresses to the whitelist, or fail to add more than a certain threshold number of addresses to the whitelist. At this point, the embodiment may assume that a sufficient number of dynamic network addresses have been identified.

In some embodiments, the higher-level procedure of steps 410-425 may be run continuously, or indefinitely at predetermined times, in order to ensure that the whitelist continues to be updated with new cached data.

In some embodiments, the polling mechanism of steps 410-425 may require a small amount of computer code to be stored on networked servers or on routing or address-resolution servers in order to poll and whitelist cached ARP requests.

Step 430 begins another iterative procedure that comprises steps 430-440. In the exemplary embodiment described here, this procedure repeats once for each open network connection identified in step 405. In other embodiments, this iterative procedure may repeat once for each IP address, hostname, or other network identifier that must be identified as being either dynamic or hardcoded.

In step 435, the system determines whether the network address (or other identifier) being considered by the current iteration of the procedure of steps 430-440 is listed in the whitelist. If the address is listed, it is assumed to be a dynamic address and the current iteration of the procedure of steps 430-440 ends.

Step 440 is performed if the system in step 435 determines that the currently considered address has not been whitelisted. In this case, the system then identifies that address as likely being a hardcoded or embedded fixed address. This address will then be identified in step 230 of FIG. 2 as requiring further processing as a hardcoded address or as requiring further verification or manual examination to confirm that it is indeed hardcoded.

Once all candidate hardcoded addresses have been considered by iterations of the procedure of steps 430-440, the method of FIG. 4 ends and the embodiment proceeds to step 230 of FIG. 2.

In some embodiments, the iterative whitelisting procedure of steps 410-425 resumes or continues to update the whitelist, perhaps running concurrently with other steps of the embodiment. This feature may improve efficiency or accuracy of the next performance of the server-based analytic method of FIG. 4.

FIG. 5 is a flow chart that describes in greater detail the "log-based" analytic method of identifying hardcoded addresses shown in step 225 of FIG. 2. FIG. 5 includes steps 500-520.

As described in the discussion of steps 210 and 225 of FIG. 2, a method of FIG. 5 is performed if a log-based analytic method is selected by step 210 of FIG. 2. Such a log-based method may be performed only if the network-migration system receives in step 210, or otherwise has access to, a TCP trace log, or other transaction log, of the migrating network or of a component of the network or its infrastructure.

In examples described in this document, the migration system may select a log-based analytic method if the migrating network's operating system or an operating system of a component of the network cannot provide information required for the system to determine whether to select either method of FIGS. 3 and 4. This may be the case, for example, if a network's servers or network-operating or maintenance software are based on a non-WINDOWS operating system, such as Linux.

The method of FIG. 5 may also be selected in cases in which an embodiment requires more granular, or transaction-specific, data to identify hardcoded network addresses. In such cases, an analytic method based on a transaction log, such as a TCP Trace Log, may allow network addresses to be analyzed with transaction-level granularity.

In some embodiments, the method of FIG. 5 may also be selected in step 210 if a network is based on a WINDOWS operating system and has utilization levels that fall below a threshold value, such that enabling the logging function does not impact production work, or is based on a non-WINDOWS operating system. In such cases, it may be difficult to accumulate sufficient cache data or DNS listings to allow a method of FIG. 3 or FIG. 4 to reliably determine whether a network address has in the past been subject to address resolution, domain-name translation, or hostname translation procedures that would characterize the address as being dynamic. In such a situation, a trace-log analysis, although perhaps not as efficient or reliable as a network-based or server-based analytic method, may still provide sufficient data to identify likely hardcoded addresses.

In step 500, the network-migration system uses one or more of these criteria to determine that a log-based analytic method of FIG. 5 (and step 225 of FIG. 2) should be used to identify likely hardcoded addresses.

In some embodiments, this determination may be subject to a previous receipt of a transaction log in step 205, or may be subject to an availability of a trace-logging function that can provide transaction-log information.

In step 505, if the system does not already have access to logging data, it enables a logging function or reads a log already recorded by such a function. In some embodiments, after reading such log data, the system may continue to update that data as new transactions are logged.

In embodiments that migrate networks based on a TCP/IP communications-protocol stack, this enabling of a logging facility may comprise enabling a TCP trace-logging function.

In embodiments that merely enable logging in step 505, and do not bulk-read previously logged data, the system may accumulate log data for weeks or months in order to obtain high-quality, very granular data. Although this method may require significant amounts of storage space and network resources, it may be extremely reliable because it captures all system transactions and network communications that occur during an extended period of time, rather than merely periodically polling a cache to retrieve most-recent subsets of transactions.

In cases like these, an embodiment may make this procedure more efficient by filtering captured log data or by capturing data associated with only certain network components or infrastructure components. This would narrow the scope of analysis, considering only a subset of all network addresses, but might greatly reduce processing overhead and storage requirements, relative to an implementation that attempts to log all network communications during a period of discovery. Such considerations may be especially significant in embodiments associated with cloud-based networks, which may comprise large numbers of communications among transient, virtual components that may not all have relevance to a network migration.

Step 510 begins an iterative procedure of steps 510-520. Each iteration of this procedure considers one logged transaction or operation received in step 500 or 505, or captured by means of a logging function enabled in step 505. In some cases, the logging function may be run continuously, and the iterative procedure of steps 510-520 may be performed every time a logged transaction or networked communication operation is recorded or captured.

In step 515, the network-migration system determines whether the logged transaction or operation lists a network address but does not list a corresponding hostname. If this is the case, the method of FIG. 5 continues with step 520.

Otherwise, the current iteration of the procedure of steps 510-520 ends and a next iteration, if any, begins. In embodiments where this iterative procedure is triggered whenever a new log entry is received, the method of FIG. 5 may simply pause until the next entry arrives.

Step 520 is performed if the system determines that the currently considered log entry identifies a network address, but does not identify a corresponding hostname. Because such an entry indicates that the network address may not resolve to a logical hostname, the system identifies this address as a likely hardcoded network address. In a TCP/IP network where the method of FIG. 5 might be analyzing a TCP trace log, such a network address would be interpreted as a likely hardcoded IP address.

Such a likely hardcoded address is then returned to the method of FIG. 2, where it will be identified in step 230 as a hardcoded address or as requiring further verification or manual examination to confirm that it is indeed hardcoded.

In some embodiments, each likely address is identified to the network-migration system as it is discovered, but in other embodiments, a group of addresses may be collected and forwarded to the system en masse. In the latter case, the method of FIG. 5 will continue to run until a sufficient number of likely hardcoded addresses are identified, until a sufficient number of log entries are analyzed, or until a specified duration of time has elapsed since last group of addresses were forwarded.

Embodiments of the present invention may implement procedures that vary somewhat from those described here in FIGS. 2-5. Certain steps may, for example, be omitted in some cases, or may be performed in slightly different order. Because the figures show only likely examples of a typical embodiment, they should not be construed to limit all embodiments of the present invention to methods that precisely match those of the examples.

What is claimed is:

1. A computerized network-migration system component of a network-management system comprising a processor, a memory coupled to the processor, a computer-readable hardware storage device coupled to the processor, and an interface to the network-management system, wherein the network-management system identifies network-configuration information that describes at least one component of a computer network to be migrated, wherein the interface allows the network-migration system to interactively access the network-configuration information, and wherein the storage device contains program code configured to be run by the processor via the memory to implement a method for identifying hardcoded IP addresses, the method comprising:

the network-migration system requesting a latest version of the network-configuration information;

the network-migration system receiving, in response to the requesting, a subset of the requested network-configuration information; and the network-migration system choosing, as a function of a way in which an Internet Protocol address of a component of the computer network to be migrated is characterized in the received network-configuration information, where the received network-configuration information does not comprise source code of a software application, a method of identifying whether the Internet Protocol address is hardcoded, where the method is selected from the group consisting of:
 a network-view method that determines whether a received DNS list comprises a first network address identified by a received server-affinity listing
 a server-based method that determines whether a received list of ARP address lookups identifies a first network address, and
 a trace-log method that determines whether a received TCP trace log identifies a first network address but does not associate a hostname with the first network address.

2. The network-migration system of claim 1, wherein the network-configuration information requested by the network-migration system comprises:
 a server-affinity listing that identifies a network address and corresponding hostname used by two or more servers comprised by the network to be migrated, wherein the two or more servers must use the network address and corresponding hostname to communicate with each other in order to function correctly,
 a list of ARP address lookups stored in an address-resolution protocol cache associated with the computer network,
 a DNS list of hostnames maintained by a Domain Name System server associated with the computer network,
 a listing of open network connections between a component of the computer network and a component of a remote resource that is not comprised by the computer network, and
 a TCP trace log that has recorded one or more operations of the computer network.

3. The network-migration system of claim 1, wherein the network-view method determines that the first network address is a hardcoded address because the first network address is not comprised by the received DNS list.

4. The network-migration system of claim 1, wherein the server-based method determines that the first network address is a hardcoded address because the address is not identified by the received list of ARP address lookups.

5. The network-migration system of claim 1, wherein the trace-log method determines that the first network address is a hardcoded address because the address is not associated in the received TCP trace log with a hostname.

6. The network-migration system of claim 1, wherein the system chooses the network-view method in response to receiving the received server-affinity listing and the received DNS list.

7. The network-migration system of claim 1, wherein the system chooses the server-based method in response to receiving the received list of ARP address lookups and a received listing of open network connections and in further response to a failure to receive a server-affinity listing.

8. The network-migration system of claim 1, wherein the system chooses the trace-log method in response to receiving the received TCP trace log.

9. The network-migration system of claim 8, wherein the system further chooses the trace-log method in response to determining that utilization of the computer network to be migrated falls below a threshold level.

* * * * *